(12) United States Patent
Reichel

(10) Patent No.: US 8,641,006 B2
(45) Date of Patent: Feb. 4, 2014

(54) HANDS-FREE CAPTURE HOOD SUPPORT DEVICE AND METHOD

(76) Inventor: David C. Reichel, Longmont, CO (US)

(*) Notice: Subject to any disclaimer, the term of this patent is extended or adjusted under 35 U.S.C. 154(b) by 550 days.

(21) Appl. No.: 12/414,513

(22) Filed: Mar. 30, 2009

(65) Prior Publication Data

US 2009/0241688 A1 Oct. 1, 2009

Related U.S. Application Data

(60) Provisional application No. 61/040,443, filed on Mar. 28, 2008.

(51) Int. Cl.
*A47F 5/00* (2006.01)

(52) U.S. Cl.
USPC .................. 248/354.1; 248/351; 248/354.5

(58) Field of Classification Search
USPC ........ 248/345.1, 351, 688, 251, 274.1, 309.1, 248/326, 333, 354.1, 354.5; 73/861.65
See application file for complete search history.

(56) References Cited

U.S. PATENT DOCUMENTS

| | | | |
|---|---|---|---|
| 5,951,071 A * | 9/1999 | Elliott | 292/338 |
| 2004/0065799 A1* | 4/2004 | Whittemore et al. | 248/354.1 |
| 2011/0042539 A1* | 2/2011 | Melic | 248/354.7 |

OTHER PUBLICATIONS

Author Unknown, Shortridge Instruments, Inc., URL printed Dec. 30, 2009 http://www.shortridge.com/main.htm, known at least as early as Mar. 28, 2008, 1 page.
Author Unknown, Shortridge Instruments, Inc URL printed Dec. 30, 2009 http://www.shortridge.com/top-frames3.htm, known at least as early as Mar. 28, 2008, 1 page.
Author Unknown, Alnor® Flow Hood Balometer, Alnor®, a Division of TSI Incorporated, URL printed Mar. 9, 2010 http://www.aikencolon.com/Alnor-Balometers__c__1379.html, known at least as early as Mar. 28, 2008, 2 pages.
Author Unknown, Alnor 6461CFM Standard Balometer Flow Capture Hood, URL printed Mar. 9, 2010 http://www.aikencolon.com/Alnor-6461CFM-6461-CFM-Standard-Balometer-Flow-Capture-Hood.html, known at least as early as Mar. 28, 2008, 3 pages.

* cited by examiner

*Primary Examiner* — Todd M. Epps
(74) *Attorney, Agent, or Firm* — Dorsey & Whitney LLP

(57) ABSTRACT

A hands-free support device and method for supporting an airflow hood relative to an airflow register is disclosed. The apparatus comprises a support device operably attached to the airflow hood and configured to support the airflow hood relative to a first surface proximate the register. The support device is configured to engage a second surface spaced away from the first surface.

22 Claims, 13 Drawing Sheets

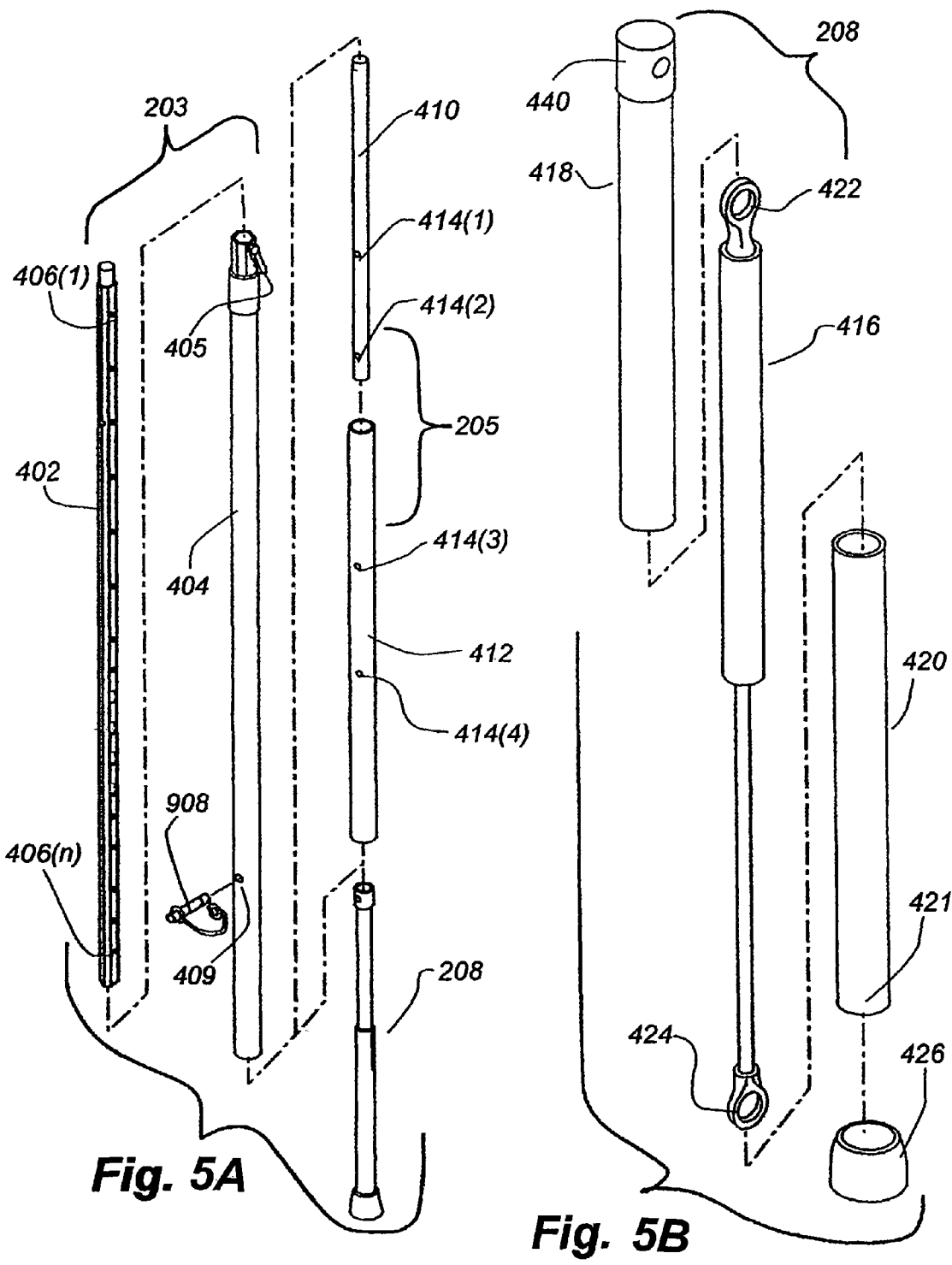

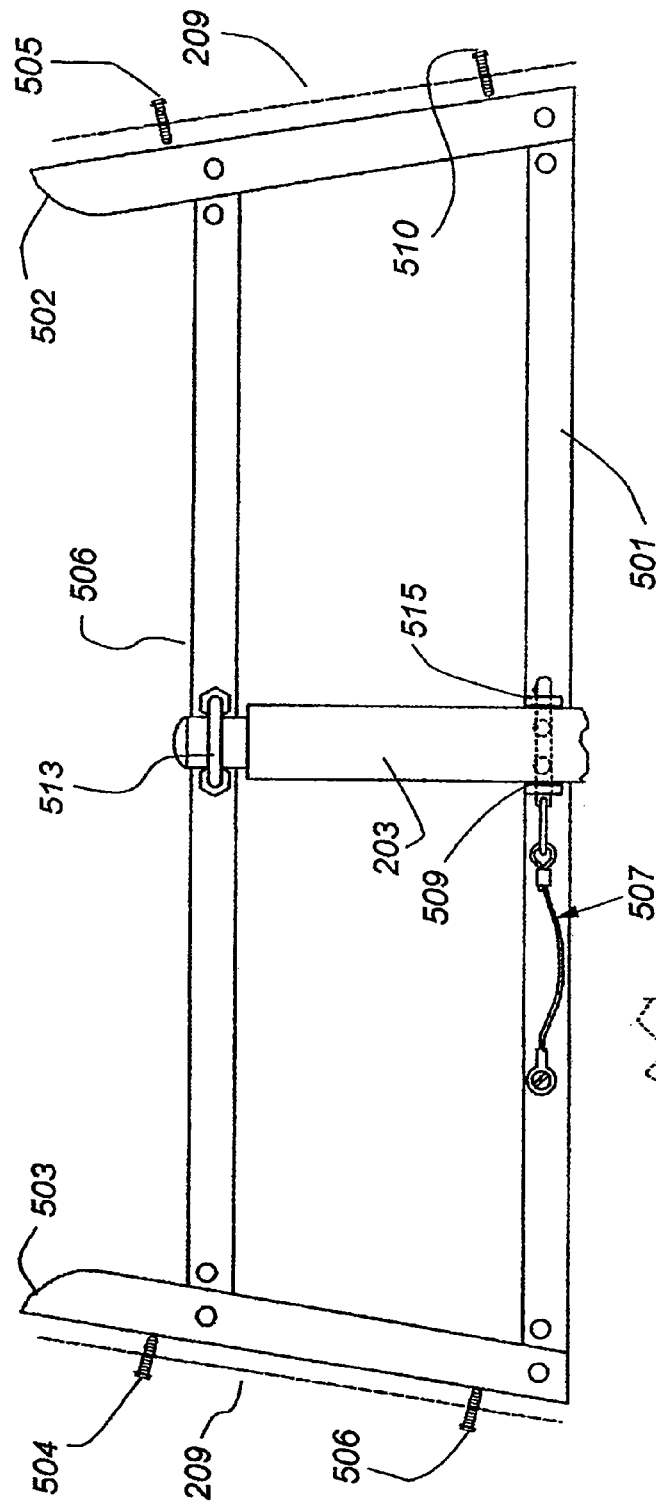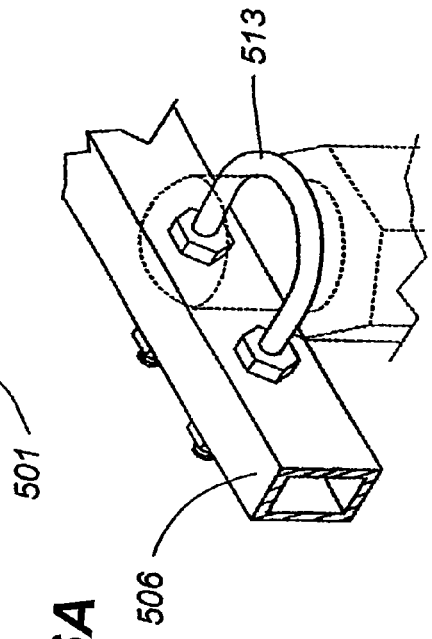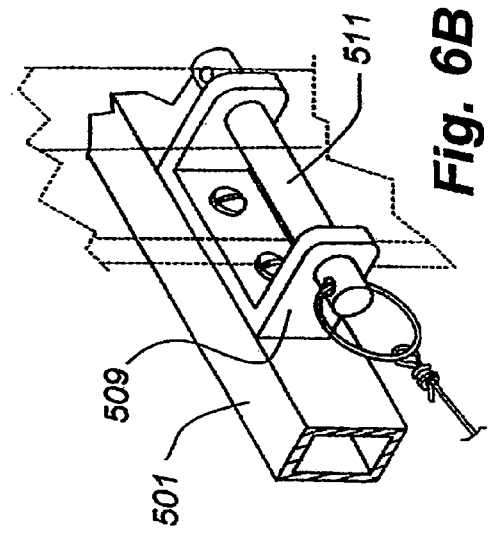

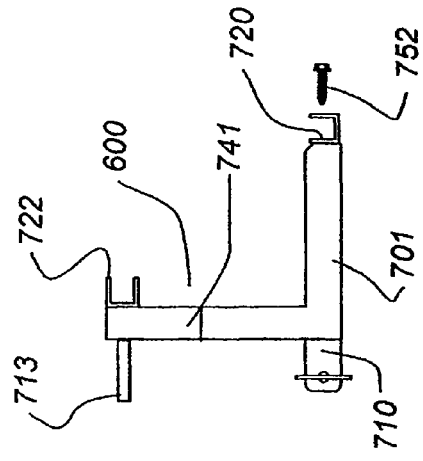
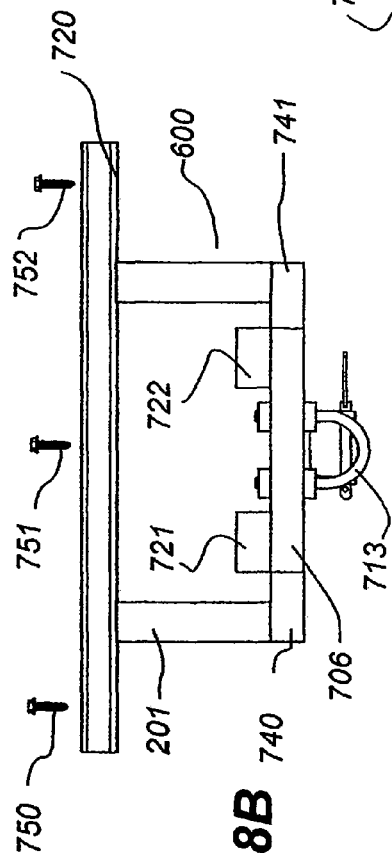
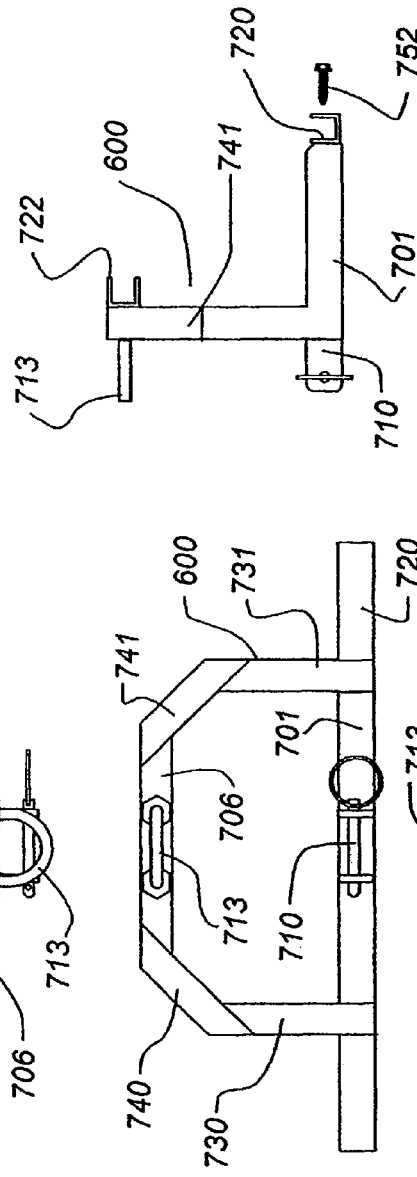
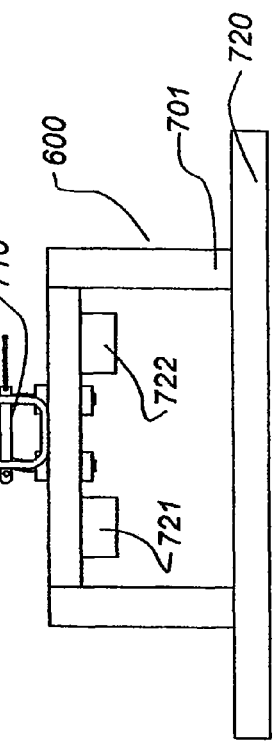
Fig. 8B
Fig. 8C
Fig. 8D
Fig. 8E

HANDS-FREE CAPTURE HOOD SUPPORT DEVICE AND METHOD

RELATED APPLICATIONS

This application claims the benefit of, under 35 U.S.C. Section 119(e), U.S. Provisional Application No. 61/040,443, filed on Mar. 28, 2008 and entitled "Hands-Free Capture Hood Support Device," the entire disclosure of which is hereby incorporated by reference.

FIELD

The present invention relates to the support of an airflow-balance device used in measuring and balancing airflow in HVAC implementations. More particularly, the present invention includes a support pole structure for holding an airflow hood relative to a ceiling register.

BACKGROUND

An important aspect of any building is its heating, ventilation, and air conditioning system (hereafter "HVAC" system). The proper operation of an HVAC system requires testing and balancing of the airflow through the registers to help ensure that the HVAC system properly heats and cools the building as designed. Airflow hoods, such as a FlowHood CFM-850L or other like product, are used to test and register the airflow and/or other ventilation parameters through a register. When the registers are located on the ceiling, the airflow hoods are held against the register during testing to measure the requisite data.

Existing methods of measuring the airflow parameters of a register require a person to hold the airflow hood against its respective register during the testing and balancing process. Because there are usually dozens of registers in a building to test and calibrate, these methods are usually inconvenient, time-consuming, and labor-intensive.

There is a need for a mechanism and related method that allows the airflow hood to be held in place against a register in an easy, efficient and convenient manner.

SUMMARY

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages in accordance with the purpose of the invention, as embodied and broadly described, the invention includes an apparatus for supporting an airflow hood relative to an airflow register. The apparatus comprises a support device operably attached to the airflow hood and configured to support the airflow hood relative to a first surface proximate the register. The support device may be configured to engage a second surface spaced away from the first surface.

Other embodiments of the support device include a biasing device to bias the airflow hood against the first surface. The support device may further include a frame operably attached to the airflow hood, and the support device may be operably attached to the frame. In addition, the frame of the support device may include at least one cross member configured to attach to the airflow hood.

In other embodiments, the support device may comprise a telescoping rod. Further, the telescoping rod may include an inner rod and an outer rod. The inner rod may be configured to selectively move towards or away from the first surface relative to the outer rod, and the outer and the inner rods may be selectively fixed relative to one another.

In another embodiment of the apparatus, the support device may comprise more than one rod. In some embodiments, the more than one rod may be configured to extend from the airflow hood to the second support surface. The more than one rod may further be configured to extend at least partially along the length of the support device between the airflow hood and the second surface. In another embodiment, the biasing device may comprise a gas-filled shock. In addition, the biasing device may be positioned adjacent a bottom of the support device and configured to engage the second support surface. The extension rod may be selectively operably associated with the support device to lengthen the support device. In a further embodiment, the airflow hood may include a device configured to obtain data representing parameters of airflow through the airflow hood and a transceiver configured to transmit the data to a remote monitoring system configured to receive the transmitted data.

One aspect of the present invention includes a method for testing the performance of an airflow register. The method comprises positioning a first airflow hood over the airflow register and against a first surface proximate the first airflow hood, supporting the first airflow hood relative to the first surface with a first support device engaging a second surface spaced away from the first surface, and measuring data representing parameters of airflow through the first airflow hood.

In another embodiment, the present method may further include positioning a second airflow hood over a second airflow register and against a third surface proximate the second airflow hood, supporting the second airflow hood relative to the third surface with a second support device engaging a fourth surface spaced away from the third surface, and measuring data representing parameters of airflow through the second airflow hood. The first and third surfaces may be on a shared ceiling and the second and fourth surfaces may be on a shared floor. Alternatively, the first and third surfaces may be on separate ceilings and the second and fourth surfaces may be on separate floors.

In further embodiments, the first support device may include a biasing device to bias the first airflow hood against the first surface. In addition, the first support device may comprise a frame operably attached to the first airflow hood and the first support device may be operably attached to the frame. Further, the measured data of the first airflow hood and the measured data of the second airflow hood may be simultaneously transmitted to a remote monitoring system configured to receive the measured data from the first and second support devices.

BRIEF DESCRIPTION OF THE DRAWINGS

FIGS. 5a and 5b show exploded perspective views of the embodiment of the present support device shown in FIG. 3.

FIGS. 6a, 6b and 6c show side and perspective views of an embodiment of the frame of the present support device.

FIGS. 8a, 8b, 8c, 8d, and 8e show top, front, bottom, side, and perspective views of an embodiment of the frame of the present support device.

DETAILED DESCRIPTION

Figure 1:
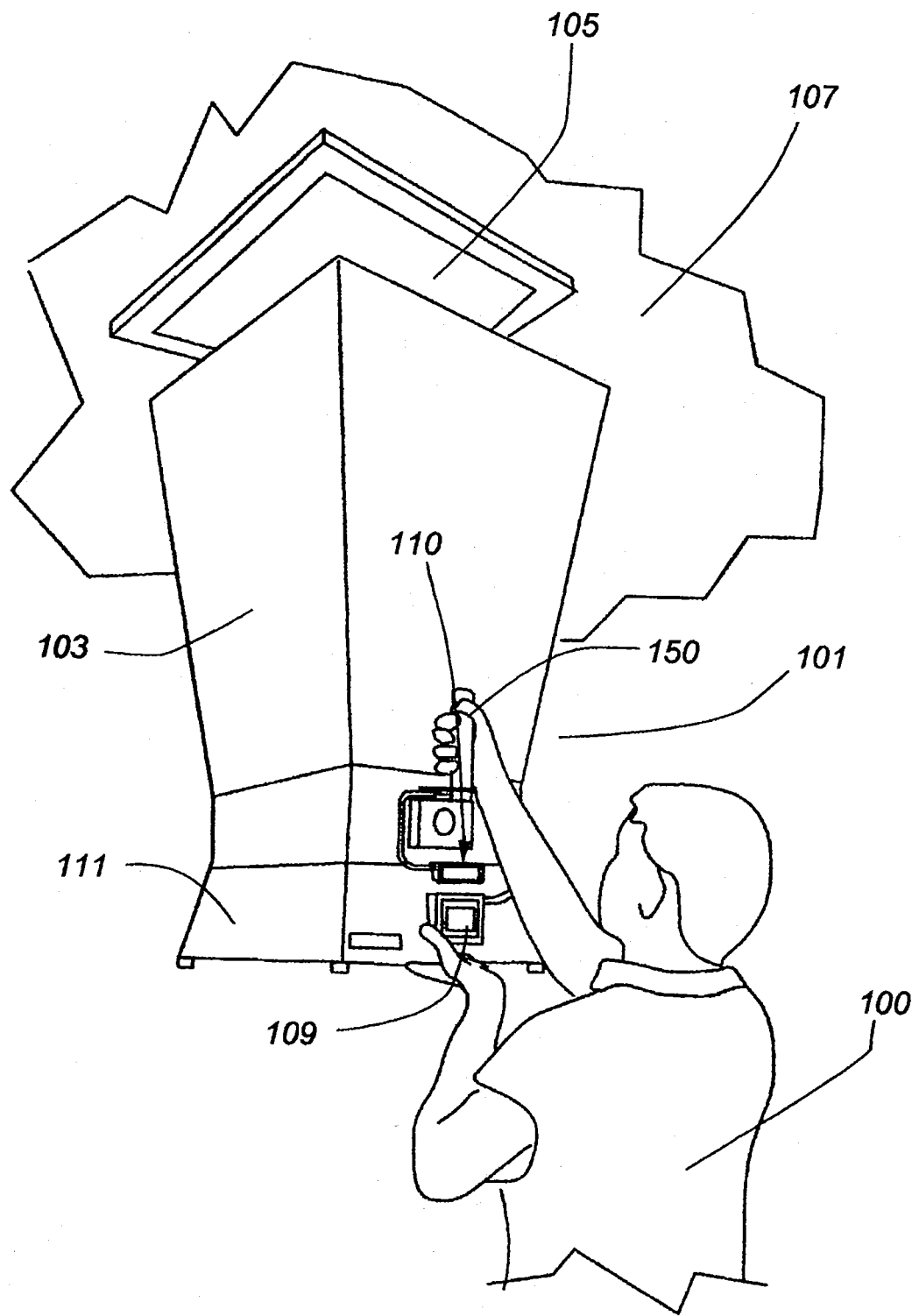
FIG. 1 shows a prior art manner of supporting a hood against a ceiling register.

FIG. 1 illustrates a typical airflow hood 101, which may comprise an air capture portion 103, a base portion 111, and a measurement device 110 mounted at the base portion 111 of the airflow hood 101. In most existing HVAC systems, heated or cooled air is distributed through the building's ductwork system and exits through a grille or register 105 provided in the ceiling 107. The air capture portion 103 of the airflow hood 101 may be placed over the register 105 around the flow path of the air to capture and supply all or some of the forced air flowing out of the grille to the base portion 111 for reading by the measurement device 110. The measurement device 110 typically includes a meter 109 displaying the airflow measurements, such as airflow velocity, volume, temperature, and duration, among other parameters. In addition, the airflow hood 101 may also include hardware for storing or recording such data, as well as wireless or physical connection means, such as a built-in transceiver unit, for communicating the measured and/or stored data to a remote device, such as a central control unit of the HVAC system, for display, compilation and/or analysis. For instance, the FlowHood CFM-850L may include an AirData Multimeter, such as the ADM-880C, to help perform these functions.

As shown in FIG. 1, existing methods for obtaining airflow measurements using an airflow hood 101 typically require that a technician 100 hold the air capture portion 103 directly over the register 105 throughout at least a portion of the entire calibration and measurement process, either by supporting the base portion 111 of the airflow hood 101, or by grasping a handle 150 provided near the base portion 111 of the airflow hood 101.

Figure 2:
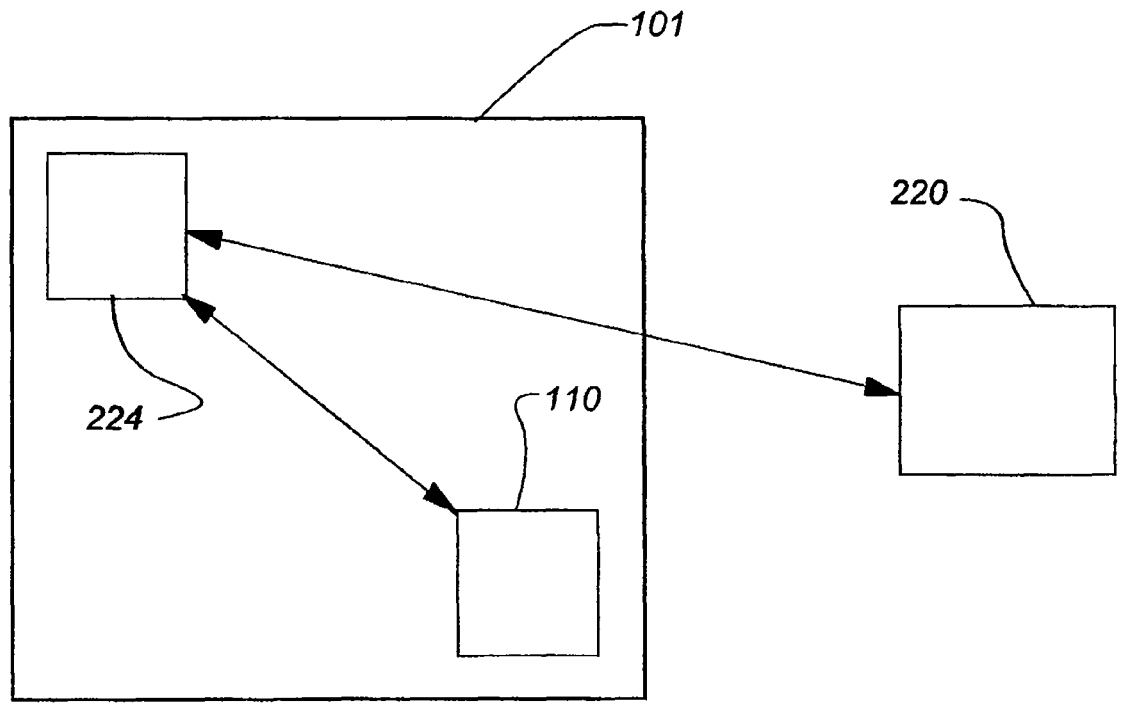
FIG. 2 is a schematic diagram of an example of a communication system of an airflow hood.

FIG. 2 illustrates one configuration of a communication system in an airflow hood 101 allowing for transmission of airflow data collected by the measurement device 110 to a remote device 220. As described above, the airflow hood 101 may include a measurement device 110 that may be configured to transmit and receive data from a transceiver unit 224. The transceiver unit 224 may be wirelessly or physically connected to the measurement device 110, as illustrated, or, in other examples, may be a component of the measurement device 110. One commercially-available example of a measurement device having a transceiver unit is the Model GC-BT-BluePort-XP made by Gridconnect, Inc. The transceiver unit 224 may further be configured to transmit and receive data obtained from the measurement device 110 of the airflow hood 101 to a remote device 220, such as a personal computer or a networked airflow hood. The remote device 220 may further be connected to one or more other devices, as will be described more fully below.

Figure 3:
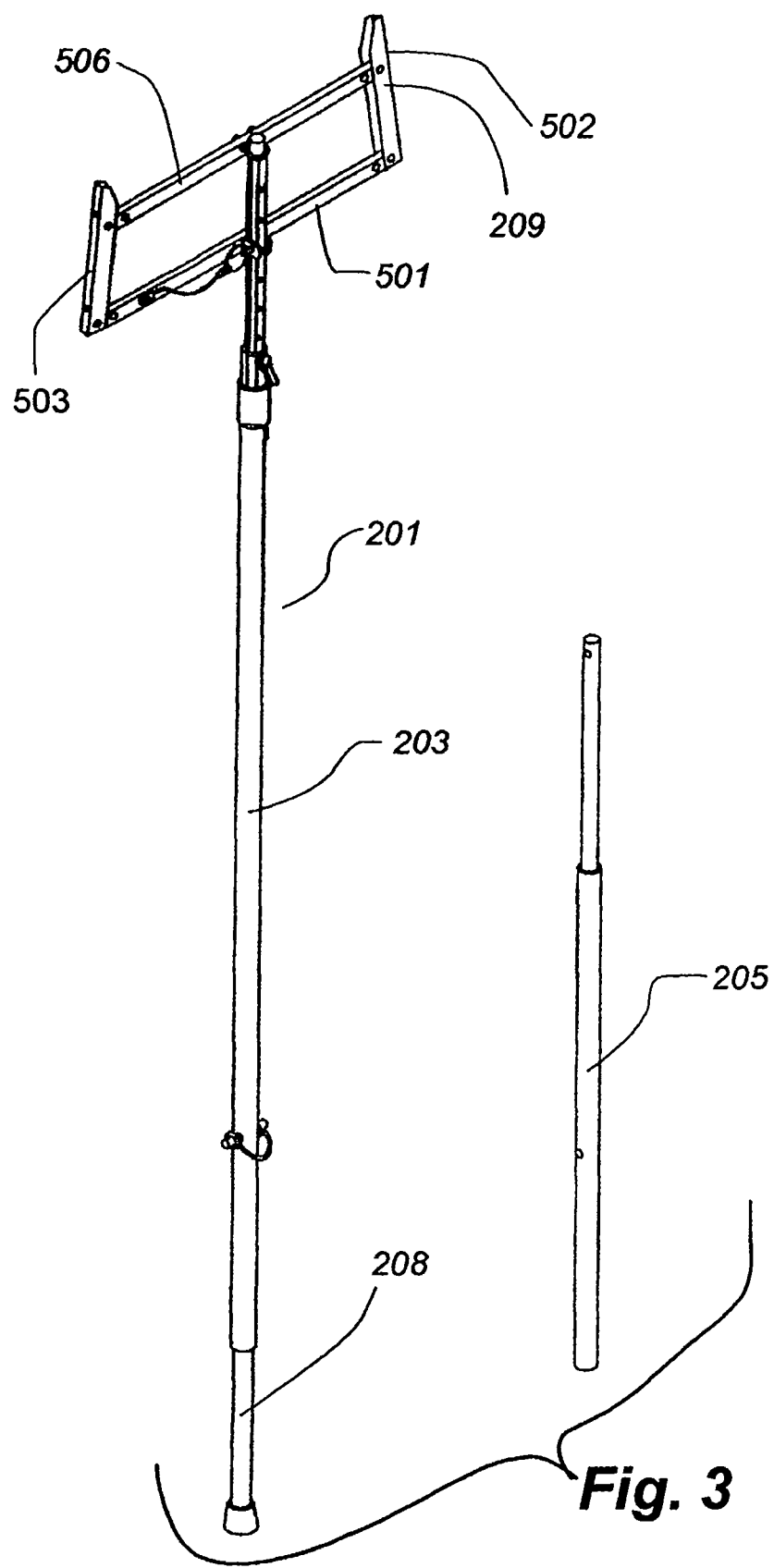
FIG. 3 shows a perspective view of an embodiment of the present support device.

FIG. 3 shows an embodiment of a hands-free support device 201 that allows the technician to perform other tasks during the testing and balancing process. For example, once the airflow hood is supported by the support device 201, the technician may move to a remote airflow monitoring device, which may not be near the register, and direct the HVAC system to increase or decrease airflow through the register.

One embodiment of the support device 201 is shown in FIG. 3. The support device 201 may include a primary adjustable length rod 203, which may engage a supporting rod, such as a gas-charged bias support 208. An optional extension rod 205 may be positioned between the primary adjustable length rod 203 and the bias support 208 to add additional length for taller ceilings. The adjustable length rod 203 may operably attach, either fixedly or removably, to a frame 209 that engages the airflow hood at its base. The particular shape, size and framework of the frame 209 may vary depending on the type of airflow hood being engaged, however, the frame 209 generally includes one or more cross members 501, 506 and/or upright members 503 and 502 that can be assembled together and attached to the airflow hood. The frame 209 may further include means for engaging and/or attaching to the airflow hood. For example, the frame 209 may be releasably or fixedly attachable to the hood using removable fasteners, such as screws, or other types of fasteners, including rivets, hook-and-loop fasteners, adhesives, or through friction fitting. Specific examples of frames designed to support models of commercially-available airflow hoods are described in detail below.

The benefits of the support device include that it requires little time to set up, has simple height adjustment, and holds the airflow hood in position relative to the register by biasing the airflow hood upwardly against the ceiling or some other structure surrounding the register. In addition, the support device allows for the testing of a plurality of registers at one time, either individually or simultaneously.

Figure 4:
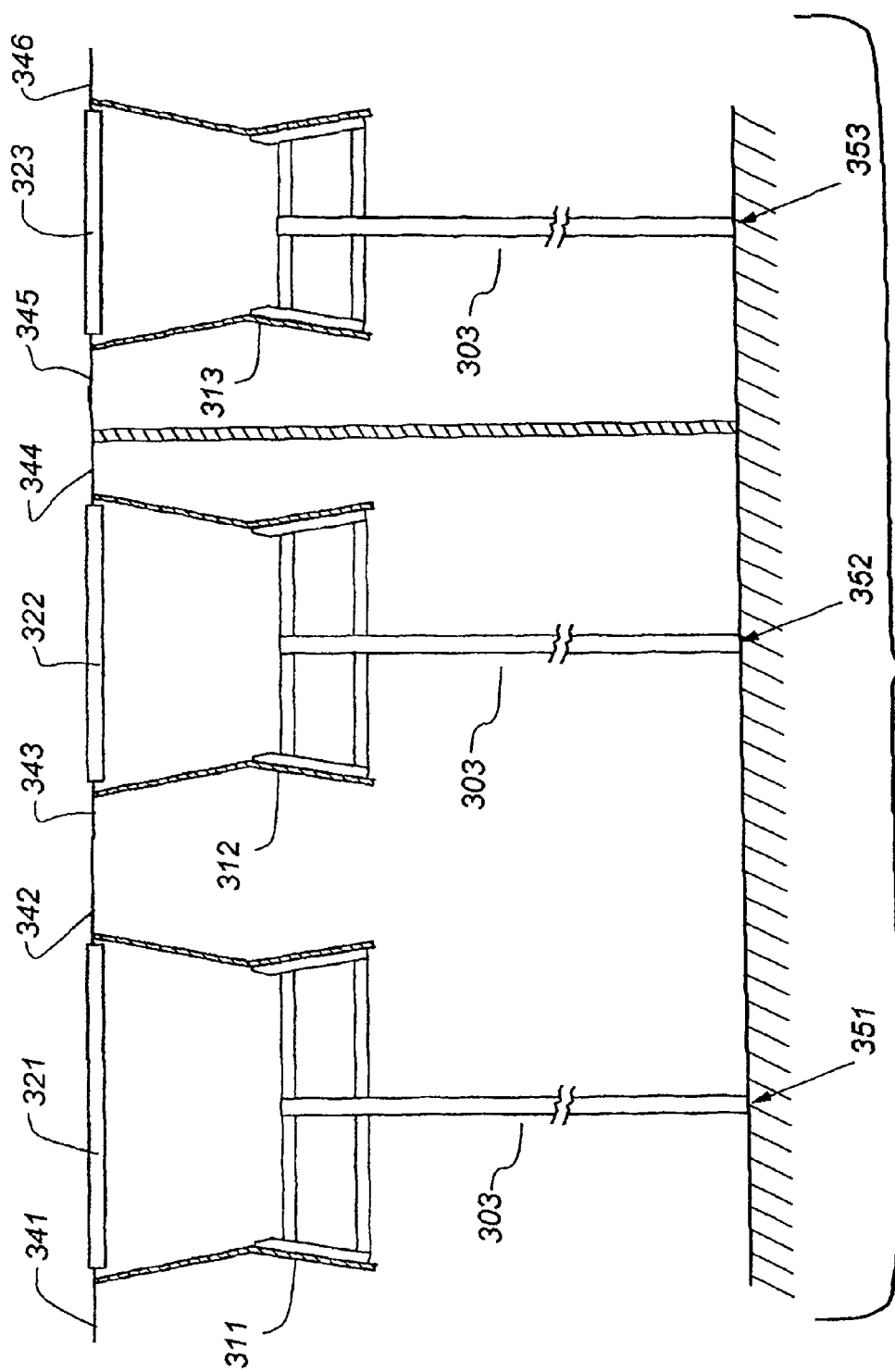
FIG. 4 shows a side view of a plurality of an embodiment of the present support device supporting a plurality of airflow hoods.

FIG. 4 illustrates a plurality of airflow hoods 311-313 being supported over registers 321-323, each by an embodiment of the support device 303. In this scenario, each hood 311-313 may be equipped with measurement and/or recording and communication capabilities, such as Model GC-BT-BluePort-XP made by Gridconnect, Inc., for transmitting data obtained from the measurement devices of the airflow hoods 311-313 to a centralized remote measuring device (not shown). As such, the technician may set up the plurality of hoods with accompanying support devices, run the HVAC system through a testing procedure, and make adjustments to its performance based on the measured and communicated results. For example, where a first hood and a second hood are used to test a first and second register, respectively, the technician may be able to test the HVAC system performance at these registers simultaneously, as well as individually. The measurements may then be communicated directly to a third receiving unit, or by daisy-chaining the communication from one hood to another hood, and then to the third receiving unit, for analysis and use in adjusting the performance of the HVAC system.

The support device 303 may be particularly helpful in testing the registers in a building where some of the registers 321, 322 are located in the same room and share the same ceiling, while other registers 323 are located in other rooms. In this case, airflow hoods 311, 312 measuring registers 321, 322 located in the same room may engage surfaces 341, 342 and 343, 344 on the same ceiling and may be supported by support devices 303 engaging surfaces 351, 352 on the same floor. In contrast, airflow hoods 312, 313 measuring registers 322, 323 located in different rooms may engage surfaces 343, 344 and 345, 346 on different ceilings, and may be supported by support devices 303 engaging surfaces 352, 353 on different floors.

FIGS. 5a and 5b illustrate exploded views of the support device, including the primary rod 203, the extension rod 205, and the bias support 208. The primary and extension rods 203, 205 may be made of any relatively rigid material, such as metal (i.e. aluminum), wood, plastic, or any other similar material so as to resist deformation and/or bending under the weight of the supported airflow hood.

Referring to FIG. 5a, the primary rod 203 may be adjustable in length. For example, the primary rod 203 may comprise a pair of cylindrical tubes 402, 404 with the top tube 402 telescoping into the bottom tube 404. The length of the rod is adjustable by moving the top tube 402 and the bottom tube 404 relative to one another and fixing their relative position by any known means. As illustrated in FIG. 5a, one such means is by a pin and hole configuration, in which the top tube 402 may have a plurality of apertures 406(1)-406(n) formed along its length. In one example, the apertures 406(1)-406(n) may form a linear line along the entire length of the top tube 402. In other examples, the apertures 406(1)-406(n) may be positioned at various non-linear points along the length of the top tube 402. A selectively removable pin structure 405 may be positioned at the top end of the bottom tube 404 and selectively inserted into one of the apertures 406(1) to 406(n) in the top tube 402 to set the combined length of the primary rod 203. Other length fixing means can include an annular friction structure, such as that commonly used in golf-ball retrievers or camera tri-pod legs. One such suitable product is the Wooster Sherlock R056. Also, a spring-loaded pin fit into the inner rod may be used, which, when aligned with an adjustment aperture in the outer rod, automatically positions itself in the aperture. To adjust the length, the pin is biased into the inner rod and the outer rod moved relative thereto to the desired aperture.

The primary rod 203 need not be cylindrical, for it may be any circular, non-circular, square, or any irregular shape that prevents the top tube 402 and the bottom tube 404 from rotating relative to one another. In other embodiments, the top tube may extend over the outside of the bottom tube, and the length fixing means may be associated with either tube in any configuration. In addition, the top tube may not be adjustable in length if the use of the support device is always for fixed-height registers.

Continuing with FIG. 5a, an extension rod 205 may be used to increase the base length of the primary rod 203. The extension rod 205 may be of any desired length and may have multiple components. For example, the extension rod 205 may comprise an insert rod 410 and an extension rod 412 that are configured to fit inside a hollow bottom end of the primary rod 203, and may be secured thereto with a removable pin structure 408, or other selectively securable attachment, such as a friction fit. Where the extension rod 205 is the same diameter as the primary rod 203, the insert rod 410 may be used to connect the primary 203 and extension 205 rods together. As an example, one end of the insert rod 410 may be positioned in the bottom end of the bottom tube 404 of the primary rod 203 and selectively held in place, such as by a removable pin structure 408. The other end of the insert rod 410 may be positioned in the hollow top end of the extension rod 412 and selectively held in place, by the same or by other means. The primary 203 and extension 205 rods may have their respective ends contacting one another to cover the insert rod 410, or the respective ends may be separated by an amount to expose a portion of the insert rod 410. Additional apertures 406(1)-406(n), 414(1)-414(4) in the primary 203 and/or extension 205 rods may be provided to allow for such adjustment along the length of the insert rod 410.

Still referring to FIGS. 5a and 5b, a bias support 208 is shown. The bias support 208 engages the primary rod 203 (or combination of primary 203 and extension 205 rods) and pushes the airflow hood up against at least a portion of the surface surrounding the register to ensure an adequate fit and help maintain the primary and extension rods 203, 205 in an upright orientation extending between the ceiling and floor (or other support surface). The bias support 208 also allows for variations in the height for which the support device is used, in the event the distance between the floor and ceiling varies from one location to another. The amount of variation of distance allowed without adding the extension rod 205 or changing the length of the primary rod 203 is determined by the stroke of the bias support 208, i.e., the distance traversed by the bias support 208 in moving from an extended position to a fully compressed position.

In one embodiment, best illustrated in FIG. 5b, the bias support 208 may include a biasing structure, such as a gas-filled shock structure 416 that may be similar to one used in holding up the hatch-back of an automobile. A suitable gas-filled shock structure 416 includes the Sachs SG359010. The gas-filled shock structure 416 may be selectively or permanently positioned inside telescoping tubes 418, 420 forming a housing for the gas-filled shock structure 416, and allowing the bias support 208 to extend and compress under load, thereby controlling the amount of telescoping required by the telescoping tubes 418, 420 to adjust the bias support 208 to the correct length. The top end 440 of the telescoping tubes 418, 420 forming the housing of the bias support 208 may be designed to fit into the hollow bottom end of the primary rod 203 or the extension rod 205, and may be selectively secured thereto with a pin (not shown), or other type of securement. The housing member may be formed from any appropriately rigid material to resist bending under the weight of the airflow hood, such as metal, wood or plastic, or from another material having similar properties.

In the particular embodiment illustrated in FIG. 5b, the top 422 and bottom 424 ends of the gas-filled shock 416 may be selectively attached to the respective portions of the telescoping tubes 418, 420 forming the housing encasing the gas-filled shock structure 410. For example, the bottom end 421 of the bias support 208 may be attached to the bottom portion 421 and/or base member 426 of the bottom telescoping tube 420, and the top end 422 of the bias support 208 may be attached to the top portion 440 of the top telescoping tube 418. The bottom end 421 of the bias support 208 or the bias support housing may be provided with a base member 426 formed from a slip-resistant material, such as an elastomeric material, to maintain engagement with the floor, or some other inanimate support surface, and maintain the support device in a relatively upright and stable position.

In other embodiments, the bias structure may not include an external housing. For instance, a gas-filled shock structure may be used without a housing structure encompassing it. In addition, the bias structure and/or its surrounding housing may have a different configuration at its base, such as a tripod configuration or an increased width, to further support and balance the hood against the register. The bias structure may be positioned at the top, bottom or middle of the support device.

An embodiment of the frame of the support device is shown in FIGS. 6a, 6b, and 6c. The frame 209 engages the airflow hood and selectively secures the hood to the primary rod 203 (as illustrated in FIG. 2). The frame 209 may be made of several relatively rigid materials, such as metal (i.e. aluminum), wood, plastic, or any other similar material. The frame 209 is designed to fit inside the airflow hood and attach to the brace members of the hood for stable engagement. In the particular embodiment shown in FIG. 6a, the frame 209 may comprise a base member 501, two upright members 503, 502 attached at either end of the base member 501, and a cross member 506 extending between upper regions of the upright members 503, 502. The upright members 503, 502 may be sloped inwardly to match the slope of the walls on the hood being serviced.

The upright members 503, 502 may be releasably attached to the walls the hood using removable screw fasteners 504, 506, 508, 510, or some other attachment means. The screw fasteners 504, 506, 508, 510 may pass through the material forming the base portion of the airflow hood to be secured to the frame 209, such as to the upright members 5031, 502. Other types of fasteners may be used, including rivets, hook-and-loop fasteners, adhesives, or the like. In addition, the frame 209 may be friction fitted to the hood being serviced. In other embodiments, the frame 209 may have more or fewer cross members 501 and/or upright members 503, 502. Further, the frame may be constructed to include frame members that engage or contact the hood peripherally (or partially peripherally) around the edge of the hood, or at the bottom edge, top edge, and/or in between.

FIGS. 6a, 6b and 6c illustrate one particular type of attachment structure 507 for securing the top portion of the primary rod 203 to the frame 209. As best shown in FIG. 6a, the frame 209 may include multiple attachment locations, for example, at a midpoint of the base member 501, and at the midpoint of the cross member 506. In other embodiments, the attachment locations may be at other positions along these members, and may also include only one attachment point or more than two attachment points.

As best shown in FIG. 6b, the attachment point along the base member includes a bracket 509 for receiving an upper end portion of the primary rod 203. The bracket 509 can be U-shaped to reduce the lateral movement of the support structure. In addition, the bracket 509 may include a hitch-pin 511 for positioning through a corresponding aperture 515 formed in the primary rod 203 to releasably secure the frame 209 to the primary rod 203 so that the primary rod 203 may be easily detached from the frame 209.

As best shown in FIG. 6c, the attachment point along the cross member may comprise a retainer loop 513. The retainer loop 513 receives a portion of the primary rod 203 above the portion received in the bracket 509. The retainer loop 513 provides lateral stability to the primary rod 203 to help keep the frame 209 and hood, when attached to the frame 209, from being overly movable. The retainer loop 513 may be made of a suitably rigid material, such as metal or plastic, or may be elastic or cloth, or any other flexible material. I The frame illustrated in FIGS. 6a to 6c may be used in conjunction with airflow hoods manufactured by Shortridge Instruments, Inc., such as its Flowhood line of air flow hoods, as well as other commercially available air flow hoods. In other embodiments, the retainer loop 513 and the bracket 509 may be reversed in position, i.e., with the retainer loop 513 on the base member 501 of the frame 209 and the bracket 509 on the cross member 506, or the retainer loop 513 may be replaced by another attachment mechanism serving to reduce lateral and longitudinal movement. For selectively removable attachments, it is contemplated that the attachment mechanism be relatively easy to actuate for ease of use.

Other attachment mechanisms for use between the frame and the support structure are contemplated, with a desired feature being the stability of the hood when attached to the frame. The stability may be rigid, or somewhat flexible to allow for slight irregularities or angles of the ceiling or other surrounding surface around the register. In certain circumstances, a secure attachment structure may be desired, for example, where the hood weighs more than approximately 20 pounds, or where the weight of the hood is unevenly distributed around the perimeter of the hood. The attachment of the frame to the hood may be permanent, for example, if the hood is to be used only with the support structure. In addition, the frame may be customized for differently-shaped hoods, and therefore may have a different structure than that described herein.

Figures 7A, 7B:
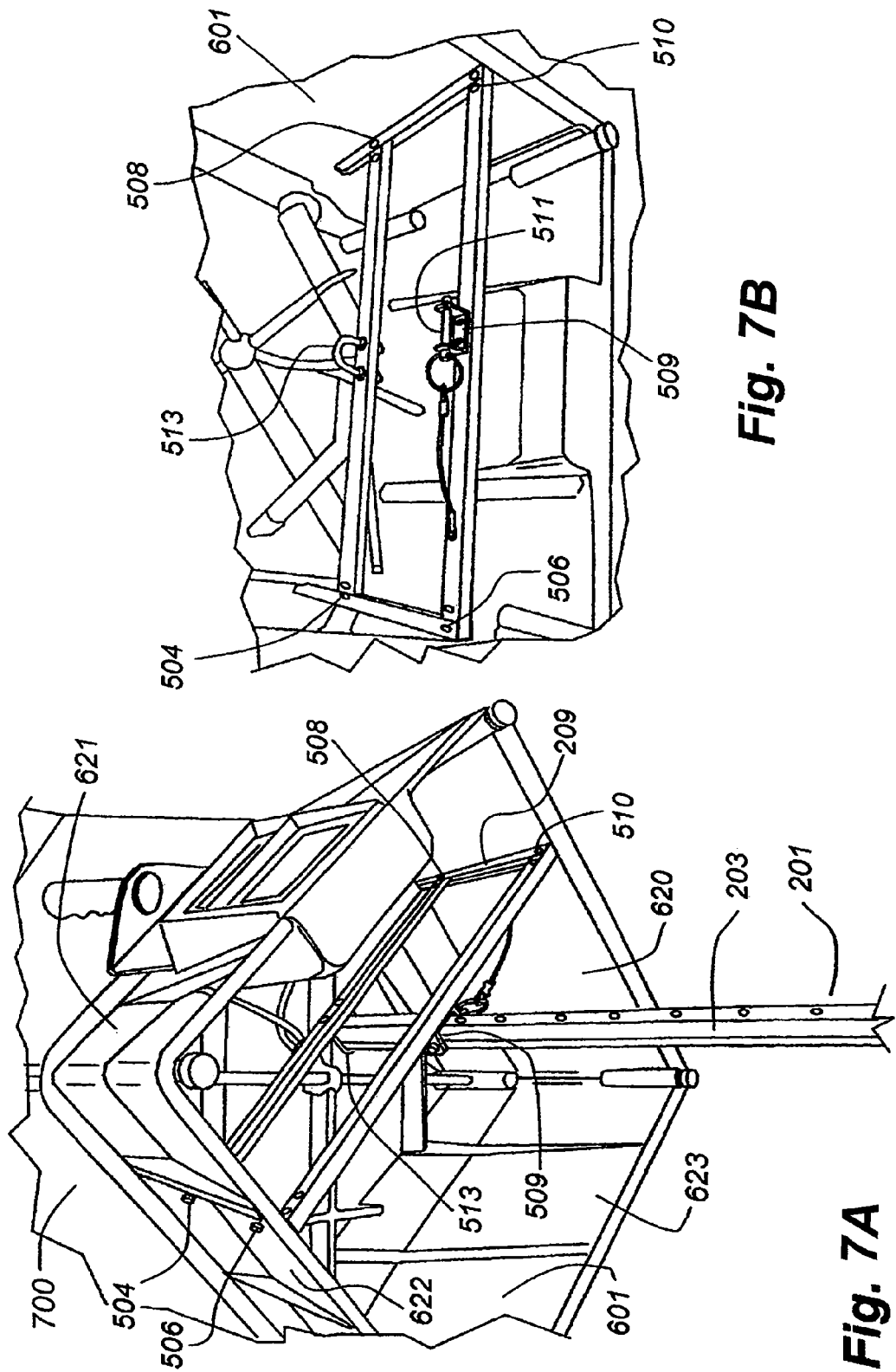
FIGS. 7a, 7b, 7c, and 7d show bottom-perspective and side-perspective views of the embodiment of the support device illustrated in FIG. 3, as used to support an airflow hood.
Figure 7C:
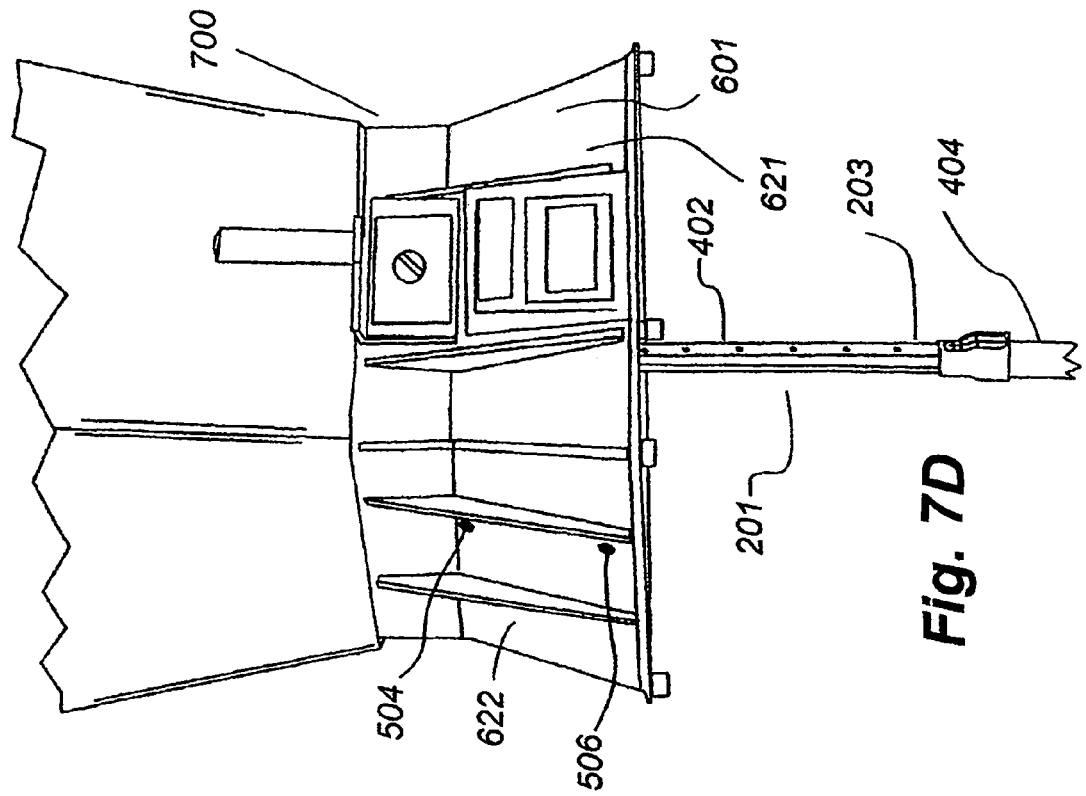
Figure 7D:
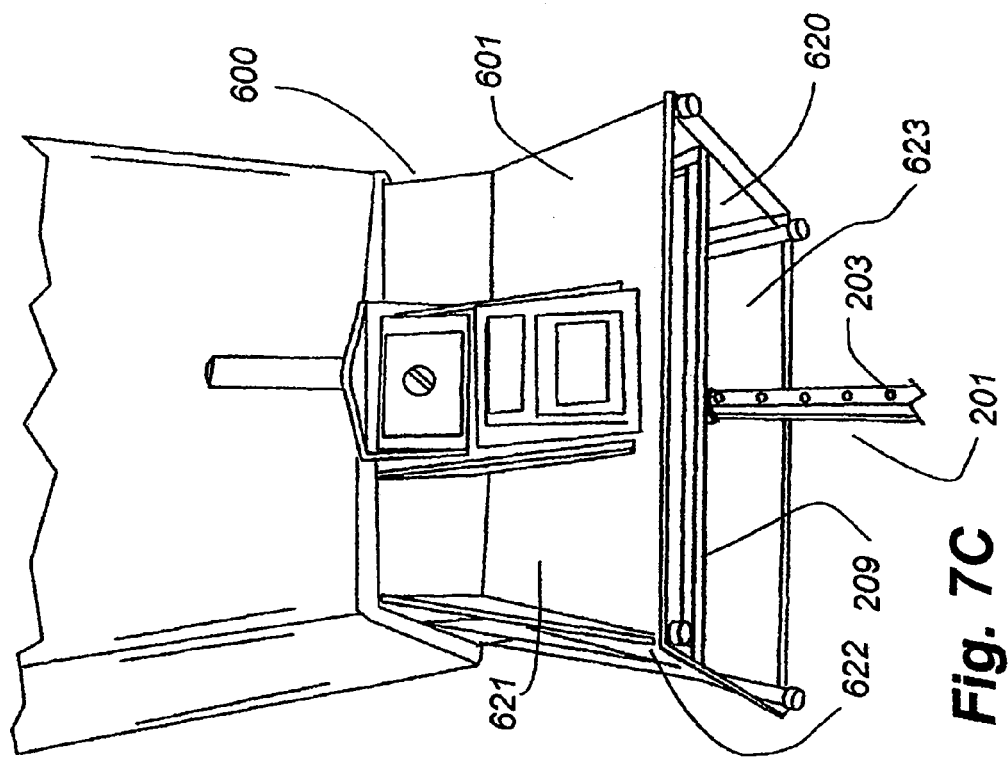

FIGS. 7a to 7d illustrate the support device 201, as installed in an example of an airflow hood 700. As shown in FIG. 7a, the frame 209 is releasably attached to the walls 620, 621, 622, 623 of the base portion 601 of the airflow hood 700 via fastening screws 504, 506. The frame 209 is supported by the primary rod 203, which also serves to support the hood 700 attached at its base portion 601 to the frame 209. As illustrated in FIG. 7b, to facilitate installation of the support device 201 in the hood 700, the frame 209 can be installed in the hood 700 before insertion of the primary rod 203 through the bracket 509 (and hitch-pin 511) and the retainer loop 513 attachment structures. After the frame 209 is installed in the hood 700, the primary rod 203 can be attached to the frame 209 and adjusted to the appropriate height. FIGS. 7c and 7d illustrate further perspective views of the support device 201 as installed in the airflow hood 700. Since the base portion 601 of the airflow hood 700 typically has a rectangular or square shape, attaching the frame 209 at two or more attachment points 504, 506, 508, 510 provided on opposite walls e.g., on 622 and 620 or 621 and 623, of the base portion 601 may allow for more equal distribution of the weight of the airflow hood 700 on the frame 209 to help maintain the frame 209 and supported hood 700 in a balanced position. As best illustrated in FIGS. 7a and 7d, the frame 209 may be centered between opposite walls 622, 620 of the base portion 601 to further help balance the hood 700 above the primary rod 203. In other embodiments, the hood 700 may be positioned forward or backward to compensate for any unequal weight distributions between the walls 620, 621, 622, 623 of the hood 700.

The order of attachment of the frame 209, airflow hood 700 and primary rod 203 is not critical. For example, the hood 700 may be attached first to the frame 209, and then the primary rod 203 to the frame 209. Alternatively, the frame 209 may be first attached to the primary rod 203, and then to the hood 700. As shown in FIG. 7d, the height of the primary rod 203 can be adjusted by moving the top tube 402 and the bottom tube 404 relative to one another and fixing their relative position, for example, using a pin and hole configuration.

An alternative embodiment of a frame 600 of the support device is illustrated in FIGS. 8a to 8e. This particular embodiment is designed to fit inside and attach to other configurations of commercially available airflow hood for stable engagement. For example, the illustrated frame 600 may be used in conjunction with airflow hoods manufactured by Alnor-TSI, such as Alnor-TSI's PH 721 Capture Hood. The frame 600 may be made of several relatively rigid materials, such as metal (i.e. aluminum), wood, plastic, or any other similar material. In the particular embodiment shown in FIGS. 8a to 8e the frame 600 may comprise a U-shaped base member 701 having a closed edge 728 and two arms 727, 729 extending therefrom at approximate right angles, two upright members 730, 731 extending from the end portions 725, 726 of the closed edge of the base member 701 and generally perpendicular to the arms 727, 729 of the base member 702, and a pair of diagonal components 740, 741 that are attached at one end to the upright members 730, 731 and at the other end to a cross member 706 extending between the top ends of the diagonal components 740, 741. The diagonal members 740, 741 may be sloped inwardly to match the slope of the walls on the base portion of the hood.

Figure 8A:
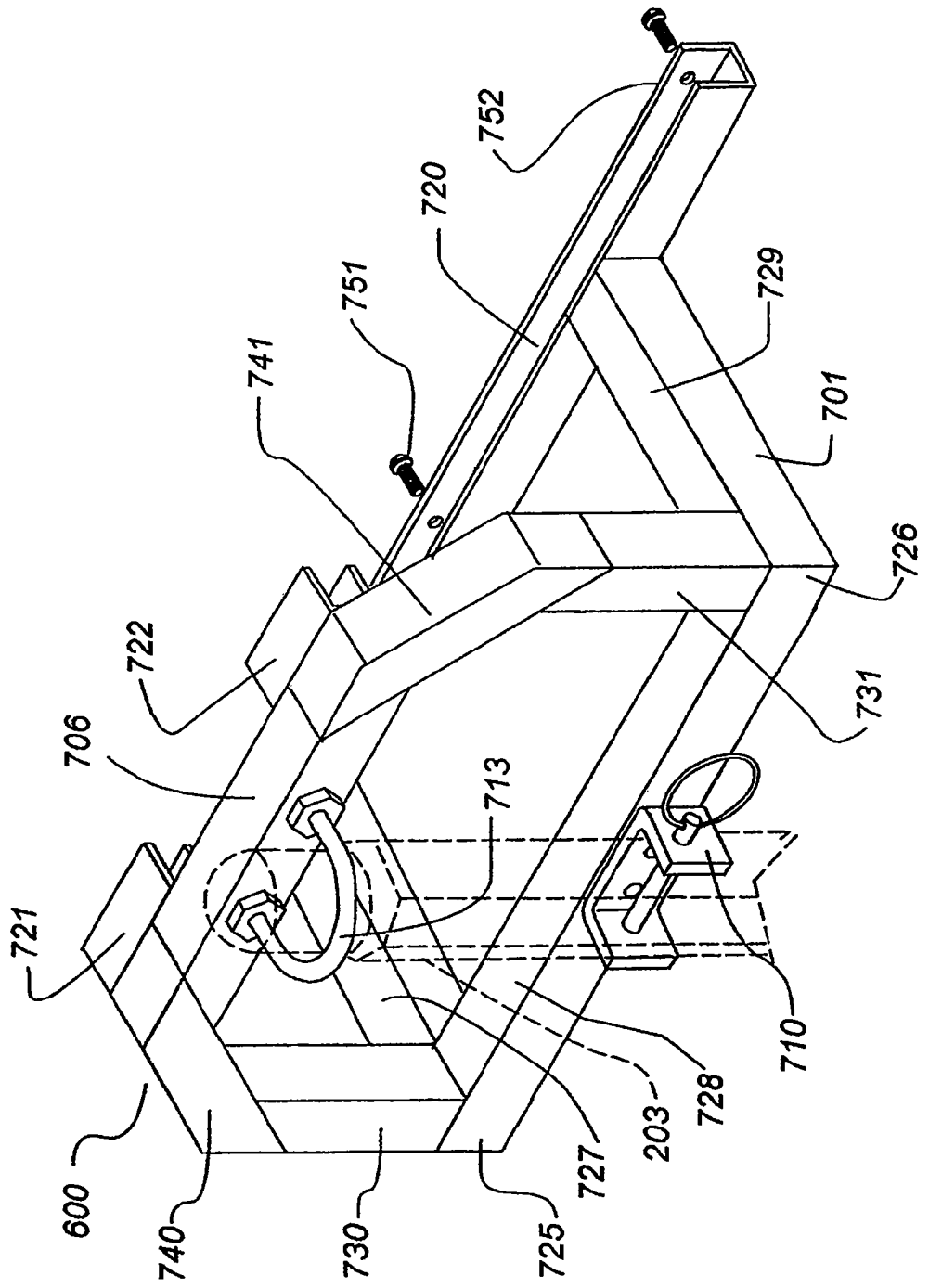

As best shown in FIGS. 8*a*, 8*d* and 8*e*, a bracket member 720 may be mounted, such as by welding, rivets, removable screws, or adhesive, to the ends of the arms of the base member 701. The bracket member 720 may be the same length as a bottom edge of one of the walls of the airflow hood, and may be releasably attached to the airflow hood using removable screw fasteners 705(1)-705(3), or some other attachment means. In other embodiments, the bracket member 720 may be shorter than the bottom edge of one or all of the walls of the airflow hood, of may be configured as two or more shorter bracket members 720, each extending along a portion of the edge of the airflow hood. Further, the bracket 720 may attach to the airflow hood using other types of fasteners, including rivets and/or welding (not removable), hook-and-loop fasteners, adhesives, or the like.

Similar to the embodiment illustrated in FIGS. 6*a* to 6*c*, this embodiment of the frame 600 may have multiple attachment locations to the primary rod 203 (as shown in FIG. 8*a*), for example, at a midpoint of the base member 701, and at the midpoint of the cross member 706. The primary rod 203 may be identical or similar to that illustrated in FIG. 5*a*, and further include one or more extension rods 205, and/or bias supports 208 (as shown in FIG. 5*b*). In other embodiments, the attachment locations may be at other positions along these members, and may also include only one attachment point or more than two attachment points. In the illustrated embodiment, the attachment point along the base member includes a U-shaped hitch-pin and bracket structure 710 for receiving an upper end portion of the primary rod 203. The attachment point along the cross member may comprise a retainer loop 713 configured to receive a portion of the primary rod 203 above the portion received in the bracket 710. Other configurations of attachment mechanisms are possible, and it is contemplated that the attachment mechanism be relatively easy to actuate for ease of use. For example, the retainer loop 713 and the bracket 710 may be reversed in position, or the retainer loop 713 or the bracket 710 may be replaced by another attachment mechanism serving to reduce lateral and longitudinal movement.

Since this illustrated frame 600 may be attached to the airflow hood on only one side, the frame 600 may further include U-shaped brackets 721, 722 mounted on opposite sides of the attachment structures 709, 710 on the cross member 706. The brackets 721, 722 are configured to rest on a ledge provided inside of the base portion of the airflow hood to better distribute the weight of the hood over the frame 600. In other embodiments, the frame 600 may have a single bracket that extends at least partially along of the length of the cross member 706. In addition, the frame 600 may have more or fewer cross members 706 and/or upright members 730, 731 that may include other attachment mechanisms for attaching to the serviced hood. Further, the frame may be constructed to include frame members that engage or contact the hood peripherally (or partially peripherally) around the edge of the hood, at the bottom edge, top edge, and/or in between, or along other ledges provided within the hood.

Figure 9:
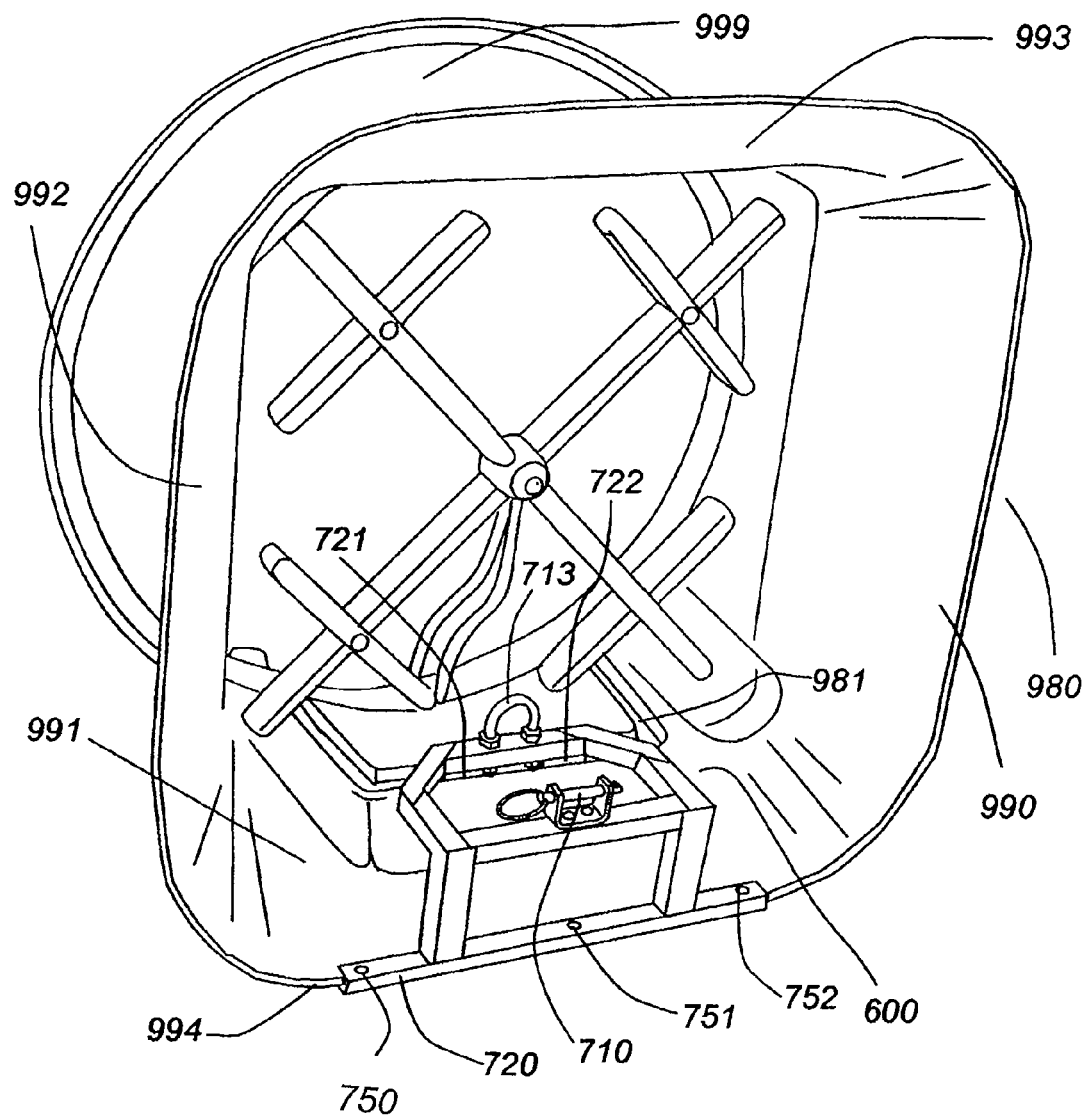
FIG. 9 shows a perspective view of the embodiment of the frame of the present support device shown in FIGS. 8a, 8b, 8c, 8d and 8e, as used to support an airflow hood.

FIG. 9 illustrates the embodiment of the frame 600 illustrated in FIGS. 8*a* to 8*e*, as installed in an example of an airflow hood 980. As shown in FIG. 9, the airflow hood 999 may include a base portion 980 having four walls 990, 991, 992, 993. The frame 600 may be releasably attached to the hood 999 at the bottom edge 994 of one of the walls 991 of the base portion 980 via bracket 720 and fastening screws 750, 751, 752. Further support for the airflow hood 999 may be provided via brackets 721, 722, which rest on a ledge created by a grooved portion 981 inside the base portion 980 of the airflow hood 980. As mentioned above, the frame 600 may engage a rod structure (not shown) similar to that illustrated in FIGS. 5*a* and 5*b* including a primary rod 203, an extension rod 205 and/or a bias support 208 that serves to bias the hood 700 against the ceiling. The frame 600 may be releasably attached to the rod structure via a U-shaped hitch-pin and bracket structure 710 and a retainer loop 713.

The order of attachment of the frame 600, hood and rod structure is not critical. For example, as shown in FIG. 9, the airflow hood 999 may be attached first to the frame 600 to facilitate assembly, and then the rod structure to the frame. Alternatively, the frame may be first attached to the rod structure, and then to the hood. In addition, the frame 600 may be installed on other walls 990, 991, 992, 993 of the airflow hood 999, or more than one frame 600 may be installed on multiple walls 990, 991, 992, 993 of the hood 999 for further support, for example, if the hood is particularly heavy.

Figure 10:
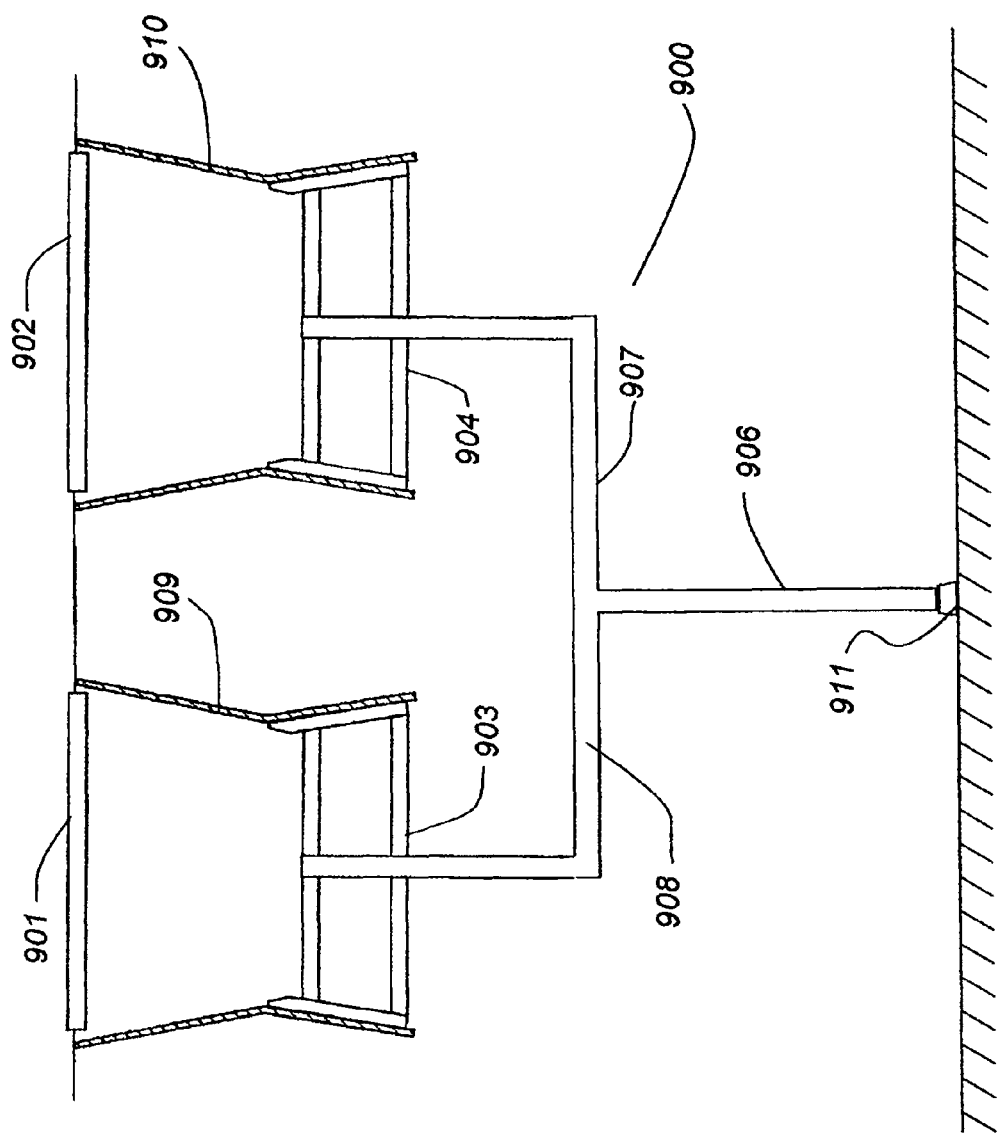
FIG. 10 shows a side view of an embodiment of the present support device.

As illustrated in FIG. 10, a forked support device 900 comprising two frames 903, 904 may be used to support more than one airflow hood 909, 910 where more than one register 901, 902 are positioned relatively closely together. The base portion 906 of the forked support device 900 may include primary 203 and/or extension rods 205, as well as a bias support 208 having a non-slip base 911 that may be similar in form and function to that previously described and shown in FIGS. 5*a* and 5*b*. In addition, the forked support device 900 may have a forked upper portion including two or more upward extending arms 908, 907, each attached to a frame 903, 904 to support a hood 904, 910. The forked upper portion may similarly comprise primary and/or extension rods, and a bias support similar to that shown in FIGS. 5*a* and 5*b*.

Figure 11:
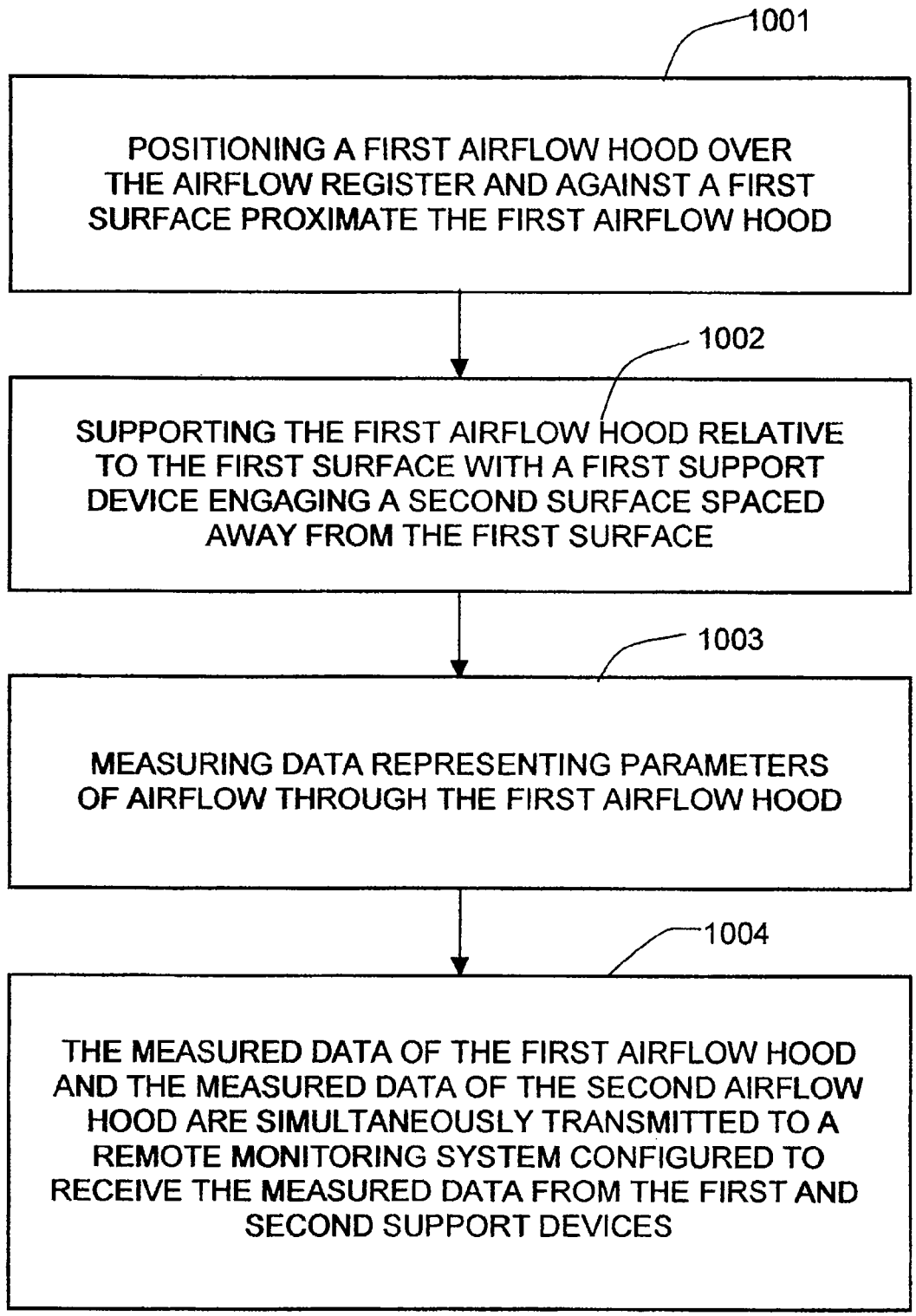
FIG. 11 is a block flow diagram of an example of a method for testing the performance of an airflow register.

FIG. 11 illustrates example block flow diagram of a method for testing the performance of an airflow register. At step 1001, a first airflow hood is positioned over the airflow register and against a first surface proximate the first airflow hood. At step 1002, the first airflow hood is supported relative to the first surface with a first support device engaging a second surface spaced away from the first surface. At step 1003, data representing parameters of airflow through the first airflow hood is measured. At optional step 1004, the measured data of the first airflow hood and the measured data of the second airflow hood are simultaneously transmitted to a remote monitoring system configured to receive the measured data from first and second support devices.

It is contemplated that the support structure may have more than one pole (meaning that it may include two rods along its entire length or partially along its length), or may include a tri-pod base or other shaped base structure. The biasing member may also be positioned at the top end in engagement with the bracket, or may be positioned between the ends of the support structure, such as in the middle of the primary rod or in the extension rod. There may be more than one biasing structure used. Each of these additional features may be accomplished by modifying the support structure.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An apparatus for supporting an airflow hood relative to an airflow register in a first surface and extending between the first surface and a lower surface, the apparatus comprising:
   a support device operably attached to the airflow hood and configured to support the airflow hood relative to the first surface proximate the register,
   the support device configured to engage the lower surface spaced away from the first surface;
   the support device having a top end and a bottom end, the top end coupled to the airflow hood and the bottom end engaging the lower surface, the support device including a biasing device to bias the airflow hood against the first surface, the biasing device comprising:
      a housing defining a top portion and a bottom portion, the top and bottom portions being axially movable relative to one another and the bottom portion of the housing having a top end and a bottom end; and
      a biasing structure having a top end coupled to the top portion of the housing and a bottom end coupled proximate the bottom end of the bottom portion of the housing, the biasing structure selectively providing an extension force to the support device for supporting the airflow hood;
   wherein the apparatus further comprises a frame coupled to the top end of the support device and configured to fit inside the airflow hood and be operably attached thereto, the frame comprising:
      a base member;
      an upright member attached at either end of the base member; and
      a cross member extending between upper regions of the upright member.

2. An apparatus as defined in claim 1, wherein the support device comprises a telescoping rod.

3. An apparatus as defined in claim 2, wherein the telescoping rod includes an inner rod and an outer rod, the inner rod configured to selectively move towards or away from the first surface relative to the outer rod, and the outer and the inner rods are selectively fixed relative to one another.

4. An apparatus as defined in claim 1, wherein the support device comprises more than one rod.

5. An apparatus as defined in claim 4, wherein the more than one rod is configured to extend from the airflow hood to the lower support surface.

6. An apparatus as defined in claim 4, wherein the more than one rod is configured to extend at least partially along the length of the support device between the airflow hood and the lower surface.

7. An apparatus as defined in claim 1, wherein the biasing device comprises a gas-filled shock.

8. An apparatus as defined in claim 1, wherein the biasing device is positioned adjacent a bottom of the support device and configured to engage the lower support surface.

9. An apparatus as defined in claim 1, further comprising an extension rod selectively operably associated with the support device to lengthen the support device.

10. An apparatus as defined in claim 1, wherein the airflow hood includes a device configured to obtain data representing parameters of airflow through the airflow hood and a transceiver configured to transmit the data to a remote monitoring system configured to receive the transmitted data.

11. An apparatus as defined in claim 1, wherein the housing comprises a first telescoping tube and a second telescoping tube.

12. An apparatus as defined in claim 11, wherein the first telescoping tube defines the top portion of the housing and the second telescoping tube defines the bottom portion of the housing.

13. An apparatus as defined in claim 1, wherein the biasing device further comprises a base member coupled to the bottom portion of the housing and configured to resist slippage of the apparatus along the lower surface.

14. An apparatus as defined in claim 2, wherein the top end of biasing device is received within a portion of the telescoping rod and selectively secured therein.

15. An apparatus as defined in claim 1, wherein the bottom end of the biasing structure is coupled to the bottom end of the bottom portion of the housing.

16. An apparatus as defined in claim 13, wherein the base member is coupled to the bottom end of the bottom portion of the housing and the bottom end of the biasing structure is coupled to the base member.

17. An apparatus as defined in claim 1, wherein the biasing device is releasably secured to one of an extension rod or a telescoping tube.

18. An apparatus as defined in claim 1, wherein the bottom portion of the biasing device housing extends along a length of the biasing structure.

19. An apparatus as defined in claim 1, wherein the bottom end of the biasing structure is attached at the bottom end of the bottom portion of the housing.

20. An apparatus as defined in claim 1, wherein the top and bottom portions of housing define respective cavities along which the biasing structure may extend and compress.

21. An apparatus as defined in claim 1, wherein the frame comprises a plurality of upright members, and said plurality of upright members are configured to be operably attached to one or more walls of the airflow hood using one or more removable fasteners.

22. An apparatus as defined in claim 21, wherein each of the plurality of upright members is sloped inwardly, relative to the base member, at an angle corresponding to one or more sloped walls of the airflow hood.

* * * * *